July 10, 1956  L. W. CREMENS  2,754,092
METALLIC HAND RAILING
Original Filed Feb. 25, 1950
4 Sheets-Sheet 1

INVENTOR.
Leroy W. Cremens
BY
Christy, Parmelee and Strickland
ATTORNEYS

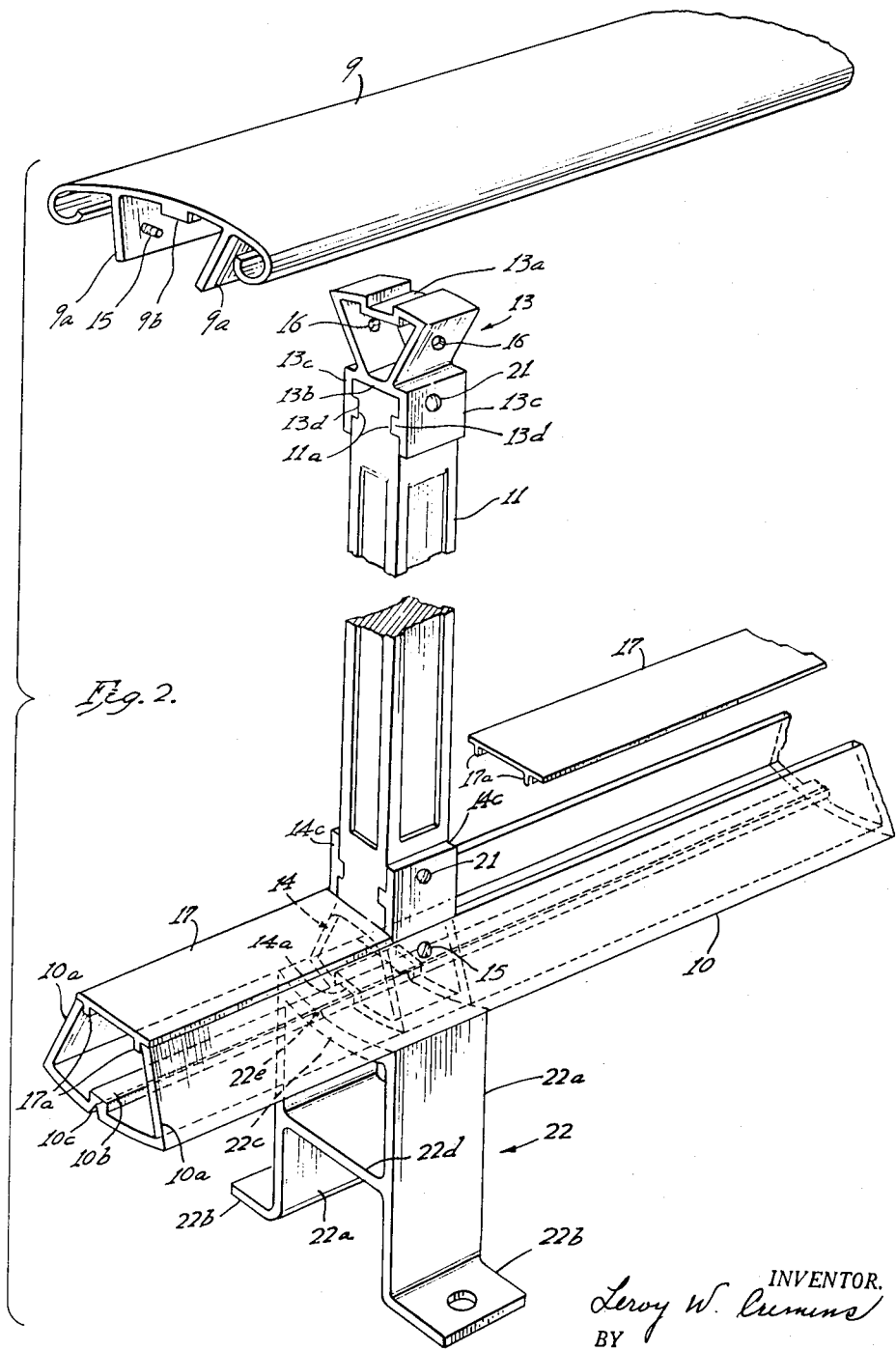

July 10, 1956 L. W. CREMENS 2,754,092
METALLIC HAND RAILING
Original Filed Feb. 25, 1950 4 Sheets-Sheet 3
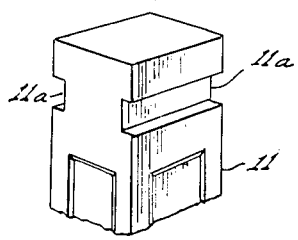
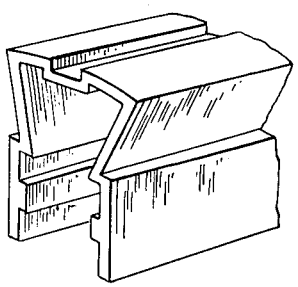
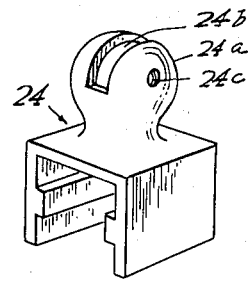
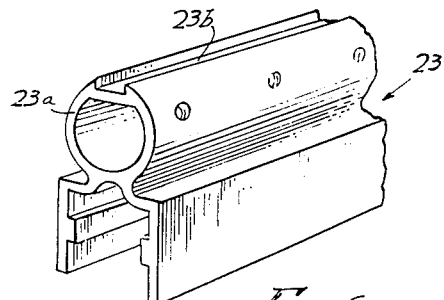
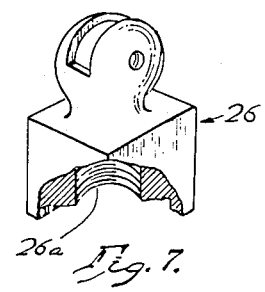
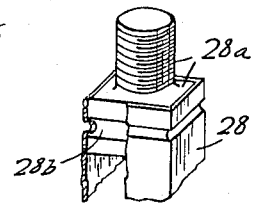
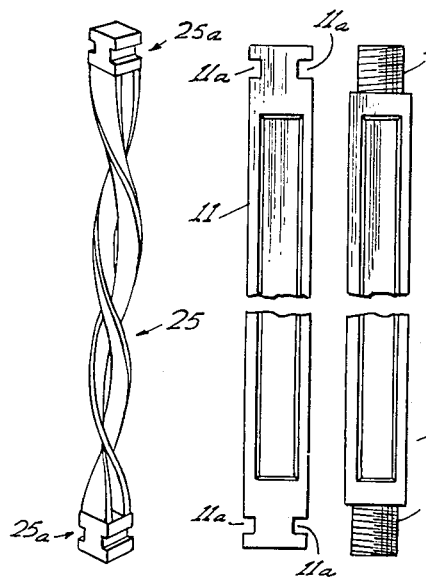
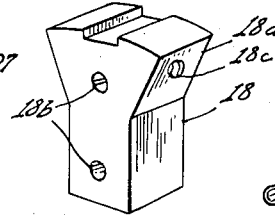
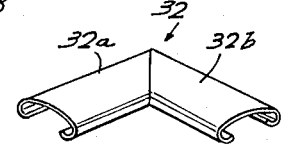
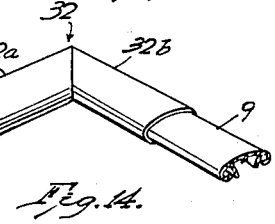
INVENTOR.
Leroy W. Cremens
BY
Christy, Parmelee and Strickland
ATTORNEYS July 10, 1956 L. W. CREMENS 2,754,092
METALLIC HAND RAILING
Original Filed Feb. 25, 1950 4 Sheets-Sheet 4

INVENTOR.
Leroy W. Cremens
BY
Christy, Parmelee and Strickland
ATTORNEYS

2,754,092
METALLIC HAND RAILING

Leroy W. Cremens, Pittsburgh, Pa.

Original application February 25, 1950, Serial No. 146,224, now Patent No. 2,654,579, dated October 6, 1953. Divided and this application March 27, 1953, Serial No. 345,023

3 Claims. (Cl. 256—21)

My invention relates to railings, balustrades, fences, and the like, and consists in certain new and useful improvements in such structures formed of metal.

The object of the inveniton is to provide a metal railing of simplified and economical construction, a construction that features novel fittings which permit the structure to be erected and assembled without the necessity of shop fabrication, and without welding. The consumer may, by means of the usual simple tools he has available, readily install the railing structure himself.

Among the other objects of the invention it may be noted that the structure is of extraordinary sturdiness and rigidity.

The invention will be understood upon reference to the accompanying drawings in which exemplary form of my railing structure is illustrated:

Fig. 2 is a fragmentary view in perspective, showing to larger scale the bottom rail of the structure with one baluster installed, and showing the top rail of the structure in position for assembly with the top of the baluster;

Fig. 3 is a view in perspective of an extruded metal section to still larger scale, from which certain socket members are cut for attaching the ends of the balusters to the rails of the structure;

Fig. 4 is a fragmentary view in perspective of the top of one of the balusters to the scale of Fig. 3;

Fig. 5 is a view to the scale of Fig. 3, showing in perspective a modified form of socket element for securing the balusters to the top and bottom rails of the structure;

Fig. 6 is a view to the scale of Fig. 3, showing in perspective an extruded metal section, from which socket elements of another modified form may be cut;

Fig. 7 is a view, comparable with Fig. 5, showing still another modified form of socket element;

Fig. 8 is a fragmentary view to the scale of Fig. 2, showing in side elevation one of the balusters used with the socket elements shown in Figs. 2, 3, 5 and 6;

Fig. 9 is a view similar to Fig. 8, showing a baluster of the form used with the socket element shown in Fig. 7;

Fig. 10 is a view to smaller scale than Figs. 8 and 9, showing in perspective one of the many variants in the form of balusters which may be used in my railing structure, the ends of this baluster being shaped for use with the socket elements of Figs. 2, 3, 5 and 6;

Fig. 11 is a fragmentary view in perspective to the scale of Fig. 7, illustrating partly in elevation and partly in section, a baluster formed of a hollow tube of metal with solid terminal portions;

Fig. 12 is a view in perspective to the scale of Fig. 3, showing a certain boss element for securing the ends of the rail members to the railing posts;

Fig. 13 is a view in perspective to smaller scale than Fig. 2 but larger scale than Fig. 1, showing a corner-piece that is used where a horizontal reach of my railing structure includes a right-angle turn;

Fig. 14 illustrates in perspective how the corner-piece of Fig. 13 unites and encloses the meeting ends of two angularly extending rail members;

Figure 1:
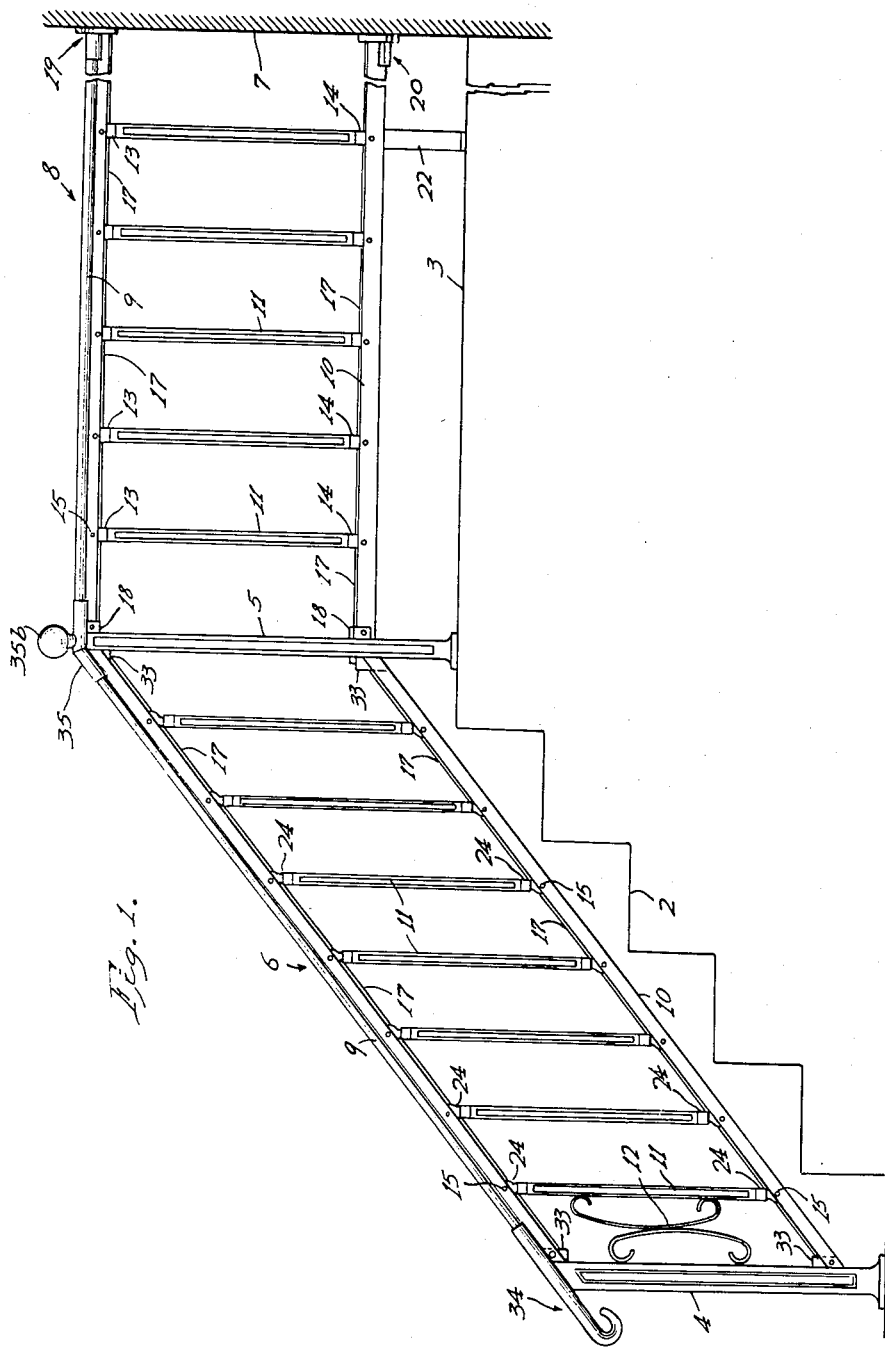
Fig. 1 is a view of a stair railing in side elevation, the view indicating in outline a flight of stairs and a horizontal platform, with my railing structure installed both on the stairs and on the platform, the railing structure on the platform being shown fragmentarily.

Referring to Fig. 1 of the drawings, a railing structure of the invention is illustrated for a flight of stairs 2 and a landing or platform 3. Between the posts 4 and 5, secured in usual manner to the floor at the bottom and top of the stairs, an inclined railing structure 6 is installed, while between the post 5 and a wall 7 a horizontal railing structure 8 extends. Each of said railing structures or portions is formed of a handrail or top rail member 9 and a bottom rail member 10, secured at their ends to the posts 4, 5 and wall 7, as shown. At uniformly spaced intervals longitudinally of the railing structure the top and bottom rail members are interconnected and rigidly integrated by means of vertical balusters 11. Between the post 4 and the adjacent baluster 11 an ornamental insert 12 of any suitable design may be installed for increasing the artistic appeal of the railing structure, and such an insert 12 may also be applied between all of the successive balusters of the structure.

Referring to Fig. 2, the top or hand-rail 9 comprises a section of extruded metal, preferably aluminum, although brass or other metal susceptible of extrusion may be the metal. The particular cross sectional form of the rail 9 is subject to wide variation in structural and artistic form, but it is desirable from the standpoint of economy that the wall thickness of the section, whatever its particular contour, shall be relatively thin, say from $\frac{1}{16}''$ to $\frac{3}{16}''$. Essentially, the rail 9 includes two downwardly directed flanges 9a, 9a that extend longitudinally of the rail body. These flanges, as will presently appear, provide a channel in which certain socket elements 13 are secured for the attachment of the upper ends of the balusters 11, which are preferably formed of the same metal as the rest of the railing structure. The bottom rail 10 is also formed of a section of extruded metal, having two upwardly directed, longitudinally extending flanges 10a, 10a, between which lies a channel wherein certain socket elements 14 are secured for the attachment of the lower ends of the balusters 11. In this case the flanges 9a, 9a in the hand-rail and the flanges 10a, 10a in the bottom rail are inclined, converging in the direction of the free edges of the flanges. Such inclination of the flanges is preferable, if not essential, as greater strength and rigidity of the rail body are thereby obtained. Also, it is to be noted that the socket elements (13 and 14) which are secured between the flanges, serve effectively to reinforce the bodies of the rails 9 and 10. However, the reinforcement obtained by the structure described is substantially increased in accordance with a feature of this invention. That is to say, between the inclined flanges of each rail member a heavy rib is integrally incorporated in the extruded metal section. More particularly, in the top or hand-rail 9 a rib 9b is formed, and in the bottom rail 10 a rib 10b is provided. The socket elements 13 and 14 are provided with grooves 13a and 14a, respectively, that snugly engage the ribs 9b and 10b of the rails 9 and 10, and thereby provide rigidity and structural strength that have hitherto been lacking in light metal railing structures.

The socket elements 13 and 14 are formed from a continuous section of extruded metal shown fragmentarily in Fig. 3. The lengths of the elements cut from the section equal the breadth of the ends of the balusters 11, the upper end of one of the balusters 11 being shown in Fig. 4, while both ends of a baluster are shown in Figs. 2 and 8.

Referring to Fig. 2, it will be understood that each of the socket elements 13 includes a head portion that snugly fits the channel formed by the inclined flanges 9a, 9a and the interconnecting web portion of the rail body 9. The groove 13a in the head portion engages the rib 9b of the rail body. The socket element 13 includes an integral transverse web 13b that augments the strength of the socket element per se, as well as the rigidity of the railing structure in which a plurality of such socket elements is incorporated. Extending downward from the head portion of the socket element is a pair of side walls 13c, 13c that are spaced apart, as shown, to provide a recess or socket to receive the upper end of a baluster 11. The side walls 13c, 13c have on their internal faces opposed tongues 13d, 13d and the upper end of the balusters include grooves 11a, 11a that engage the tongues on the internal faces of the side walls 13c, 13c.

The socket elements 14 for the bottom ends of the balusters are shown to be identical in form to the top socket elements 13, and are cut from the same extruded stock as that shown in Fig. 3. It need merely be noted that the bottom socket elements 14 are inverted counterparts of the socket elements 13, and are engaged to the rib 10b and secured between the flanges 10a, 10a of the bottom rail 10 in substantially the same manner as the top socket elements 13 are assembled in the top rail 9.

The socket elements, as well as the rest of the structural organization shown in Fig. 2, are manifestly designed for a railing that extends horizontally, such as the railing portion 8 of Fig. 1. In making the assembly of such a railing portion, the number of balusters required in the given length of railing is determined, and top and bottom rails 9 and 10 are cut from the extruded stock to proper length. Then the required number of stock to proper length. Then the required number of socket elements 13 are assembled in the top rail 9 and secured in properly longitudinally spaced positions, as by means of set-screws 15 (Fig. 2) passed through the flanges 9a, 9a and engaged in threaded holes 16 in the head portion of each socket element. Likewise, socket elements 14 are assembled and secured in complementarily spaced relation in the bottom rail 10, and in the intervals between the socket elements 14, the upwardly open channels between the flanges 10a, 10a are closed by means of cover plates 17 secured to the top edges of the said flanges of the bottom rail. In exemplary way snap-flanges 17a are provided on the cover plates to engage the inner edges of the flanges 10a, 10a.

The ends of the top and bottom rails are secured to the post 5 and the wall 7, by means of special attachment elements designed for this purpose. The special elements for attaching the rail ends to the post 5 may comprise blocks 18. As shown in Fig. 12, such blocks 18 comprise a head portion 18a formed to fit snugly in the end of the channel formed between the flanges 9a, 9a of the top rail. Holes 18b are formed in the block, through which screws are passed to engage the block to the upper portion of post 5. The end of the top rail is positioned over the head portion 18a of the block and secured thereto by means of screws passed through the flanges 9a, 9a into engagement with threaded holes 18c in the block. (Fig. 12).

The bottom rail 10 is secured to the post 5 by means of a block which is the same as block 18 that secures the top rail, only inverted in position.

Figure 19:
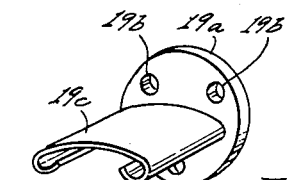
Fig. 19 is a view in perspective of a bracket element for securing the top and bottom rails of the railing structure to a wall or other vertical support.

The top rail is secured to the wall 7 by means of a terminal element, such as shown in Fig. 19, comprising a flange portion 19a provided with holes 19b for lag screws to secure the element to the face of the wall 7, and a sleeve portion 19c that is formed telescopically to engage and secure the right-hand end of the top rail as indicated in Fig. 1. A similar terminal element 20 (Fig. 1) is provided telescopically to engage the end of the bottom rail and secure it to the wall.

When the top and bottom rails, with the socket elements 13 and 14 installed, have been mounted between the post 5 and wall 7, the balusters 11 are assembled between the paired, vertically aligned socket elements of the top and bottom rails. The showing of Fig. 2 will clearly reveal to those skilled in the art the manner in which the ends of the balusters are engaged in the socket elements. Screws 21 passed through side walls 13c and 14c may be tightened in threaded engagement with the body of the baluster, to assure absolute rigidity and permanence of the assembly.

In those cases where the railing is of six or more feet in length, one or more base elements 22 are provided at appropriate points medially to add support for the structure. As shown in Fig. 2 such base elements may consist of a section cut from extruded stock, including two vertical legs 22a, 22a having out-turned feet 22b that may be anchored, as by means of floor-bolts or lag screws, to the platform or floor 3. The top of the basal element comprises a transverse web 22c extending integrally between the tops of legs 22a and being dished or inversely arched to receive the curved under face of the bottom rail 10. A transverse web 22d is provided for reinforcement of the base element.

The bottom rail 10 includes a central, longitudinal V-groove 10c that engages a rib 22e formed on the top of the base element, thereby insuring a centering and alignment of these parts. It will be understood that screws (not shown) may be employed rigidly to engage the top web 22c of the base element to the curved wall of the bottom rail 10, thus providing absolute security of assembly.

Thus, the horizontal railing structure is formed and installed. There are many permissive modifications in details of construction, within the spirit of the invention. The extruded stock 23, from which such modified socket elements may be cut, is shown in Fig. 6, and a consideration of this figure will reveal how each of the socket elements (otherwise identical with socket elements 13, 14) may have a cylindrical head portion derived from the hollow tube portion 23a of the stock. This tube portion includes a groove 23b which in each of the socket elements cut from the stock provides a groove to engage the ribs 9b or 10b in the top and bottom rails.

In further modification each socket element may comprise a metal casting 24 (Fig. 5), having a substantially spherical head portion 24a, formed with an arcuate groove 24b that is adapted to engage the ribs 9b or 10b of the top or bottom rails. The spherical head is provided with threaded holes 24c to receive the screws 15 (Fig. 2) that secure the socket elements to the rails 9 and 10.

While this socket element is perfectly adapted for use in the horizontal railing structure presently under consideration, it may be noted that the curved form of the head portion and the groove of this type of socket element permits of the inclination of the rails with respect to the balusters, as is essential in the inclined railing portion for the stairway (2, Fig. 1), as will presently appear. Each of the forms of socket elements thus far described are designed to receive and secure the grooved ends of the type of balusters shown in Figs. 2, 4 and 8. The particular form of the balusters between the grooved upper and lower ends may take a wide variety of detailed construction. In Fig. 10 is shown one of the many variants. The body 25 of the balusters may consist of two straps of metal twisted to serpentine contour between the grooved end pieces 25a, 25a.

In lieu of the tongue-and-groove engagement of the balusters to the socket elements, other types of union may be used, and in Fig. 7 the form of socket element shown in Fig. 5 is modified, in exemplary way, to provide for the threaded attachment of balusters to the socket elements. Specifically, the socket element 26 of Fig. 7 includes a threaded socket 26a, and the top of each baluster is formed with a threaded stem 27 (Fig. 9) for threaded assembly in such socket. The lower end of the baluster is provided with a stem 27a, which is provided with a left-hand thread, while the stem 27 at the top of the baluster has a right-hand thread. The socket elements 26 for the top rail 9 will correspondingly have right-hand threads, while the socket elements of the bottom rail will have left-hand threads. Thus, by placing the threaded stems at the upper and lower ends of a baluster in the opposed pair of socket elements in the top and bottom rails, the rotation of the baluster will run the threaded stems of the baluster home in the threaded sockets of said elements. This modification is in many instances a very desirable structure. Its use, however, means that the assembly of the socket elements, top and bottom rails, and balusters is to be made before the railing structure is secured to the post 5 and wall 7, but this is not a prohibitive condition in most cases.

Fig. 11 illustrates that the balusters need not be formed of solid extruded bars, but may be formed of either extruded or fabricated tubes 28 of aluminum, stainless steel, or the like, having at each end an attaching portion 28a for engaging the baluster to a socket element of the railing structure. Each attaching element may consist of an independently fashioned device fitted and secured in the end of the tube, as by means of "dimpling" the wall of the tube into engagement with a groove 28b in the body of the attaching element.

Figure 21:
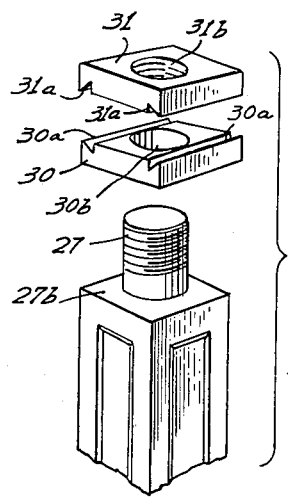
Fig. 21 is an "exploded" view in perspective of the modified form of baluster and securing means used with the modified socket element shown in Fig. 20.
Figure 20:
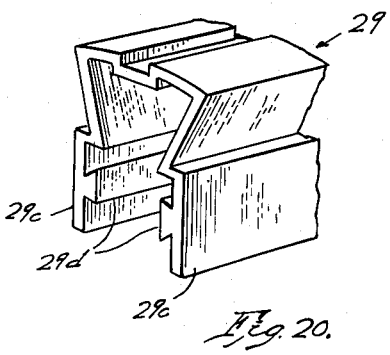
Fig. 20 is a view in perspective to the scale of Fig. 3, showing still another modification in the form of the socket element.

Before turning to a consideration of the assembly of the inclined railing portion 6 (Fig. 1), there is still to be described another modification of the structure of the socket elements for the horizontal railing structure. Fig. 20 illustrates another variant of extruded stock 29 of which to form the socket elements 13 and 14. This stock may be identical with that shown in Fig. 3, except that the tongues 29d on the side walls 29c are of dove-tail shape, as shown. With socket elements cut from the stock 29, the balusters may be of the same form as shown in Fig. 9 or Fig. 11, but with this form of baluster having, as it does, threaded attachment stems, a washer element 30 and a nut 31 are provided as shown in Fig. 21. The washer 30 freely fits over the threaded stem 27, and is provided with wedge-shaped edges 30a, 30a that severally engage the bottom edges of the dovetailed tongues 29d (Fig. 20), while the nut 31 is provided with wedge-shaped edges 31a, 31a that engage the top edges of said tongues. The bore 31b of the nut element 31 is threaded for screw engagement with the stem 27 of the baluster. It will be perceived that, with the nut and washer elements positioned above and below the dovetailed tongues 29d, 29d of the socket element cut from stock 29, the stem 27 of the baluster may be inserted through the orifice 30b of the washer element and into screw-threaded engagement with the nut element 31, and that, by turning the baluster, the screw stem may be caused to draw the elements 30 and 31 together into a tightly locked engagement with the dove-tailed tongues 29d, 29d of the socket element. The shoulder 27b of the baluster is drawn and forced against the bottom of the washer element 30, and so the washer element, nut element, and the upper end of the baluster are locked in rigid union with the socket element and with the top rail with which the socket element is assembled. The same assembly may be employed to secure the lower end of the baluster to the bottom rail of the railing structure, it being noted that the thread on the stem at the lower end of the baluster, and the thread in the lower nut element will be left-handed, so that the rotation of the baluster will lock the washer and nut element at both the upper and lower ends of the baluster simultaneously to the socket elements in the top and bottom rails 9 and 10. Each baluster may be thus secured in the railing structure.

In some cases the horizontal rail structure will extend in two reaches that intersect angularly. For such installations a corner-piece 32 of the form shown in Fig. 13 may be provided, to give a smooth finish at the corner of the meeting reaches of the hand-rail 9. The corner-piece 32 comprises two sleeve portions 32a and 32b that are telescopically fitted upon the intersecting or meeting ends of two top rails 9, as shown in Fig. 14.

Turning now to a consideration of the inclined railing portion 6 (Fig. 1), the ends of the top and bottom rails 9 and 10 are cut on an angle to abut flush against the facing sides of the posts 4 and 5, and blocks 33 are secured to such posts to receive and secure the ends of the inclined rails 9 and 10, after the manner that the blocks 18 receive and secure the horizontal rails, already described. The blocks 33 are substantially the same in form as the blocks 18, save that the sides of the head portion of the blocks 33 are chamfered to adapt them to the inclination of the top and bottom rails of the inclined railing 6.

The socket elements for securing the balusters 11 to the inclined top and bottom rails are of the form 24 shown in Fig. 5, in which the spherical head 24a and the arcuate groove 24b, engaged to the ribs (9b and 10b, Fig. 2) of the rails, permit the socket elements to be angularly adjusted in the vertical plane, defined by the center lines of the top and bottom rails, into such positions that the upper and lower ends of the balusters 11 may be secured to the socket elements, as shown in Fig. 1. In view of what has been described of the horizontal rail structure, it is needless further to elaborate on the assembly of the inclined railing portion 6. It may be noted, however, that the socket element 26 may be employed in the inclined railing, with the form of baluster shown in Fig. 9.

Figure 15:
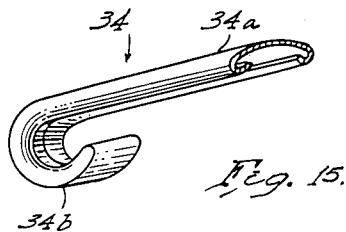
Fig. 15 is a view to slightly larger scale than Figs. 13 and 14, showing in perspective a terminal-piece for the railing structure.
Figure 16:
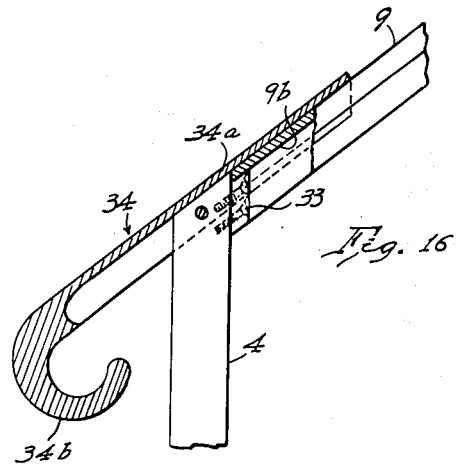
Fig. 16 is a fragmentary view in vertical section, showing to slightly larger scale the terminal-piece of Fig. 15 in assembly with the railing structure.

The lower end of the hand-rail 9 of the inclined rail is equipped with a terminal-piece 34 that lends a finished appearance to the structure. As shown in Figs. 15 and 16, the terminal-piece includes a sleeve portion 34a that is secured telescopically upon the lower end of the rail 9, and a curled tip portion 34b. The terminal-piece 34 provides a finish of neat and pleasing appearance, screening the joint where the hand-rail 9 is united to the post 4.

Additionally, at the point where the horizontal and inclined rails 9 of the railing structure are united to the post 5, a finish-element 35 is provided. This finish-element is formed of two sleeve portions 35a, 35a that are united in a seam 35c, and on the horizontal sleeve portion a railing knob 35b is fixed. The finish element 35 is assembled telescopically upon the meeting ends of the horizontal and inclined sections of the hand-rail 9, as shown in Fig. 1, and as thus assembled a neat finish of the joint of the rail sections 9 with the post 5 is provided.

Figure 17:
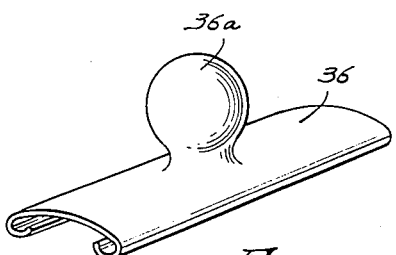
Fig. 17 is a view to the scale of Fig. 16, showing in perspective a device for installing a ball or knob where desired on the top-rail of the railing structure.
Figure 18:
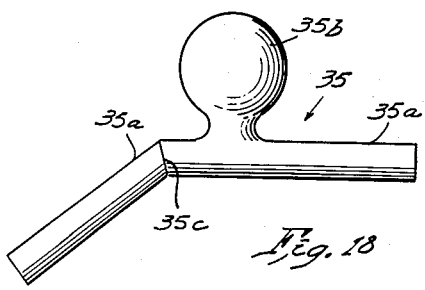
Fig. 18 is a view in side elevation, illustrating a device for uniting the top-rail of the railing structure at the point where an inclined railing portion merges with a horizontal rail portion.

At any point in the rail 9 where a hand-knob is desired, a sleeve-element 36, of the sort shown in Fig. 17, may be installed on the rail, such sleeve element bearing a knob 36a.

It may be noted that the hollow rails 9 and 10 of the structure are adapted to form raceways for housing electrical circuit wires and/or conduits for water or other fluid.

Notice is given of my copending application for patent, Serial No. 146,224, filed February 25, 1950, now Letters Patent No. 2,654,579, of which my present application is a division.

I claim:

1. In a railing structure comprising an extruded metal hand-rail body having two downwardly directed longitudinally extending flanges spaced apart transversely of the hand-rail body, and a longitudinally extending rib integrally formed on the said body between said flanges, together with a plurality of socket elements secured in spaced relation longitudinally of the hand-rail body, and balusters removably secured severally at their upper ends in said socket elements; the improvements herein disclosed wherein said flanges extend downwardly a substantial distance below said rib for laterally supporting said socket elements below said rib and screening from view said rib and the engagement of the socket elements therewith, said socket elements having each a hollow head portion including a groove for snugly engaging said rib on the hand-rail body and side portions for engagement by said flanges.

2. In a railing structure comprising an extruded metal hand-rail body having two downwardly directed longitudinally extending flanges spaced apart transversely of the hand-rail body, and a longitudinally extending rib integrally formed on the said body between said flanges, together with a plurality of socket elements secured in spaced relation longitudinally of the hand-rail body, and balusters removably secured severally at their upper ends in said socket elements; the improvements herein disclosed wherein said flanges extend downwardly a substantial distance below said rib for laterally supporting said socket elements below said rib and screening from view said rib and the engagement of the socket elements therewith, said socket elements having each a head portion engaged to said hand-rail body between said flanges, and a socket portion extending downwardly from said portion and opening downwardly to receive the top of one of said balusters.

3. In a railing structure comprising an extruded metal hand-rail body having two downwardly directed longitudinally extending flanges spaced apart transversely of the hand-rail body, and a longitudinally extending rib integrally formed on the said body between said flanges, together with a plurality of socket elements secured in spaced relation longitudinally of the hand-rail body, and balusters removably secured severally at their upper ends in said socket elements; the improvements herein disclosed wherein said flanges extend downwardly a substantial distance below said rib for laterally supporting said socket elements below said rib and screening from view said rib and the engagement of the socket elements therewith, said socket elements having each a hollow head portion including a groove for snugly engaging said rib on the hand-rail body and side portions for engagement by said flanges, and each socket element having a socket portion extending downwardly from said head portion and opening downwardly for receiving and engaging the top of one of said balusters.

References Cited in the file of this patent

UNITED STATES PATENTS

| | | |
|---|---|---|
| 1,772,159 | Roth | Aug. 5, 1930 |
| 1,796,175 | Winston | Nov. 10, 1931 |
| 2,427,723 | Hawkins et al. | Sept. 23, 1947 |
| 2,431,546 | Edwards | Nov. 25, 1947 |
| 2,517,959 | Baldwin | Aug. 8, 1950 |
| 2,590,929 | Bush | Apr. 1, 1952 |